(12) United States Patent
Tonomura

(10) Patent No.: US 11,466,039 B2
(45) Date of Patent: Oct. 11, 2022

(54) CYCLIC AMINOORGANOXYSILANE COMPOUND AND PROCESS FOR PRODUCING THE SAME

(71) Applicant: Shin-Etsu Chemical Co., Ltd., Tokyo (JP)

(72) Inventor: Yoichi Tonomura, Joetsu (JP)

(73) Assignee: SHIN-ETSU CHEMICAL CO., LTD., Tokyo (JP)

( * ) Notice: Subject to any disclaimer, the term of this patent is extended or adjusted under 35 U.S.C. 154(b) by 533 days.

(21) Appl. No.: 16/446,232

(22) Filed: Jun. 19, 2019

(65) Prior Publication Data

US 2019/0389887 A1 Dec. 26, 2019

(30) Foreign Application Priority Data

Jun. 20, 2018 (JP) .............................. JP2018-116813

(51) Int. Cl.
*C07F 7/18* (2006.01)

(52) U.S. Cl.
CPC ............ *C07F 7/1804* (2013.01); *C07F 7/188* (2013.01)

(58) Field of Classification Search
None
See application file for complete search history.

(56) References Cited

U.S. PATENT DOCUMENTS

| | | | | |
|---|---|---|---|---|
| 4,727,168 A * | 2/1988 | Yoshino | ............... | C09D 183/14 556/408 |
| 8,049,027 B2 | 11/2011 | Honma et al. | | |
| 9,371,341 B2 * | 6/2016 | Kawakami | ............ | C07F 7/1804 |
| 10,266,555 B1 * | 4/2019 | Tonomura | ............. | C07F 7/1804 |
| 2004/0077892 A1 * | 4/2004 | Arkles | ........ | C07F 7/10 556/407 |
| 2008/0091041 A1 * | 4/2008 | Bauer | ............... | C07F 7/188 556/413 |
| 2016/0102111 A1 * | 4/2016 | Kawakami | ............ | C07F 7/1804 556/408 |
| 2017/0002030 A1 * | 1/2017 | Honma | ................ | C07F 7/1804 |

FOREIGN PATENT DOCUMENTS

| | | |
|---|---|---|
| EP | 3009439 A1 | 4/2016 |
| EP | 3015471 A1 | 5/2016 |
| EP | 3015471 B1 * | 2/2018 ............ C07F 7/1876 |
| JP | 2010-120925 A | 6/2010 |
| JP | 2010-285406 A | 12/2010 |
| JP | 2014-1152 A | 1/2014 |

OTHER PUBLICATIONS

CAS Abstract and Indexed Compound, M. Yoshino et al., U.S. Pat. No. 4,727,168 (1988) (Year: 1988).*
A. Kurochkal et al., "Six- and seven-membered 1-oxa-4-aza-2-silacyclanes as possible correctors of adaptational mechanisms", Metal Based Drugs (1998) (Year: 1998).*
Extended European Search Report for corresponding European Application No. 19180507.6, dated Sep. 19, 2019.

* cited by examiner

*Primary Examiner* — Alexander R Pagano
(74) *Attorney, Agent, or Firm* — Birch, Stewart, Kolasch & Birch, LLP

(57) ABSTRACT

A cyclic aminoorganoxysilane compound having the following general formula (1):

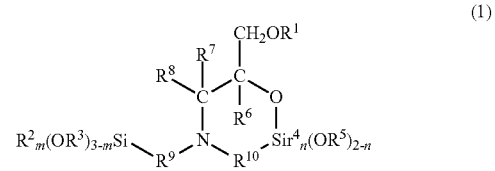

(1)

wherein $R^1$ represents a substituted or unsubstituted monovalent hydrocarbon group having 1 to 20 carbon atoms, $R^2$ to $R^5$ each independently represent a substituted or unsubstituted monovalent hydrocarbon group having 1 to 20 carbon atoms, $R^6$ to $R^8$ each independently represent a hydrogen atom or a substituted or unsubstituted monovalent hydrocarbon group having 1 to 20 carbon atoms, $R^9$ and $R^{10}$ each independently represent a substituted or unsubstituted divalent hydrocarbon group having 1 to 20 carbon atoms optionally containing a heteroatom, m is 0, 1 or 2 and n is 0 or 1.

3 Claims, 4 Drawing Sheets

CYCLIC AMINOORGANOXYSILANE COMPOUND AND PROCESS FOR PRODUCING THE SAME

CROSS-REFERENCE TO RELATED APPLICATION

This non-provisional application claims priority under 35 U.S.C. § 119(a) on Patent Application No. 2018-116813 filed in Japan on Jun. 20, 2018, the entire contents of which are hereby incorporated by reference.

TECHNICAL FIELD

The present invention relates to a cyclic aminoorganoxysilane compound and a process for producing the same, and more specifically, relates to a cyclic aminoorganoxysilane compound useful as a silane coupling agent, a surface treatment agent, a resin additive, a paint additive, an adhesive or the like and a process for producing the same.

BACKGROUND ART

A silane compound having an amino group is useful as a silane coupling agent, a surface treatment agent, a resin additive, a paint additive, an adhesive or the like. As such a silane compound having an amino group, an organoxysilane compound having a primary amino group such as aminopropyltrimethoxysilane, an organoxysilane compound having a secondary amino group such as N-phenylaminopropyltrimethoxysilane, an organoxysilane compound having a tertiary amino group such as dimethylaminopropyltrimethoxysilane and the like have been known.

However, since these silane compounds have only one amino group and one organoxysilyl group per molecule, when they are used as silane coupling agents, surface treatment agents, resin additives, paint additives, adhesives and the like, there may be cases in which the effect due to introduction of the functional groups is less exerted.

In order to solve the above-described problems, a tertiary aminosilane compound having an intramolecular organoxysilyl group (see Patent Documents 1 and 3), a secondary aminosilane compound having an intramolecular organoxysilyl group (see Patent Document 2), and the like have been proposed.

When these compounds react with moisture in the air, a hydroxyl group is formed in addition to the amino group originally possessed, and the above-described effect due to introduction of the functional group is enhanced. In addition, the intramolecular organoxy group moiety does not generate alcohol with low boiling point such as methanol and ethanol when it reacts with moisture in the air, and therefore, a compound having the intramolecular organoxy group is useful as a compound with less environmental burden.

Further, bis(trimethoxysilylpropyl)amine having two organoxysilyl groups and one secondary amino group has been proposed as a compound having a plurality of organoxysilyl groups, and it has been known that a crosslinked network can be formed by its addition.

CITATION LIST

Patent Document 1: JP-A 2010-120925
Patent Document 2: JP-A 2010-285406
Patent Document 3: JP-A 2014-001152

SUMMARY OF THE INVENTION

However, each compound disclosed in Patent Documents 1 to 3 only has, as the functional group per molecule, one amino group, one hydroxyl group formed by reacting with moisture in the air and one organoxysilyl group. Furthermore, though bis(trimethoxysilylpropyl)amine has two organoxysilyl groups and one amino group as functional groups, with the diversification of the purpose of using as a silane coupling agent, a surface treatment agent, a resin additive, a paint additive, an adhesive or the like in recent years, a silane compound having a higher addition effect has been demanded. The addition effect may be low in the case when compounds disclosed in Patent Documents 1 to 3 and bis(trimethoxysilylpropyl)amine are used, and a sufficient addition effect has not necessarily been obtained.

The present invention has been made in view of the above-described circumstances, and an object of the present invention is to provide a silane compound having a larger addition effect when used as a silane coupling agent, a surface treatment agent, a resin additive, a paint additive, an adhesive or the like and having less generation of alcohol with low boiling point at the time of use, as well as a process for producing the same.

As a result of diligent studies to achieve the above-described object, the present inventor has found that when a certain cyclic aminoorganoxysilane compound is used as a silane coupling agent, a surface treatment agent, a resin additive, a paint additive, an adhesive or the like, the addition effect is higher and the generation of alcohol with low boiling point is lower at the time of use, thus completing the present invention.

That is, the present invention provides:
1. A cyclic aminoorganoxysilane compound having the following general formula (1):

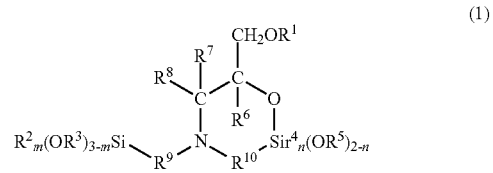

wherein $R^1$ represents a substituted or unsubstituted monovalent hydrocarbon group having 1 to 20 carbon atoms, $R^2$ to $R^5$ each independently represent a substituted or unsubstituted monovalent hydrocarbon group having 1 to 20 carbon atoms, $R^6$ to $R^8$ each independently represent a hydrogen atom or a substituted or unsubstituted monovalent hydrocarbon group having 1 to 20 carbon atoms, $R^9$ and $R^{10}$ each independently represent a substituted or unsubstituted divalent hydrocarbon group having 1 to 20 carbon atoms optionally containing a heteroatom, m is 0, 1 or 2 and n is 0 or 1;
2. A process for producing the cyclic aminoorganoxysilane compound according to item 1, the process including distilling a reaction mixture obtained by making an aminoorganoxysilane compound having the following general formula (2):

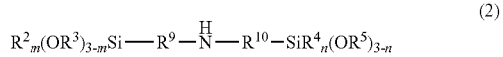

wherein $R^2$ to $R^5$, $R^9$, $R^{10}$, m and n represent the same meanings as those defined above react with an epoxy compound having the following general formula (3):

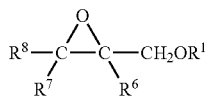

(3)

wherein $R^1$ and $R^6$ to $R^8$ represent the same meanings as those defined above; and 3. The process for producing the cyclic aminoorganoxysilane compound according to item 2, the process further including distilling the reaction mixture in the presence of a basic catalyst or an acidic catalyst.

Advantageous Effects of the Invention

Since the cyclic aminoorganoxysilane compound according to the present invention exerts a higher addition effect as compared with conventionally known compounds, the cyclic aminoorganoxysilane compound according to the present invention can be useful as a silane coupling agent, a surface treatment agent, a resin additive, a paint additive, an adhesive or the like.

DESCRIPTION OF THE PREFERRED EMBODIMENT

Figure 1:
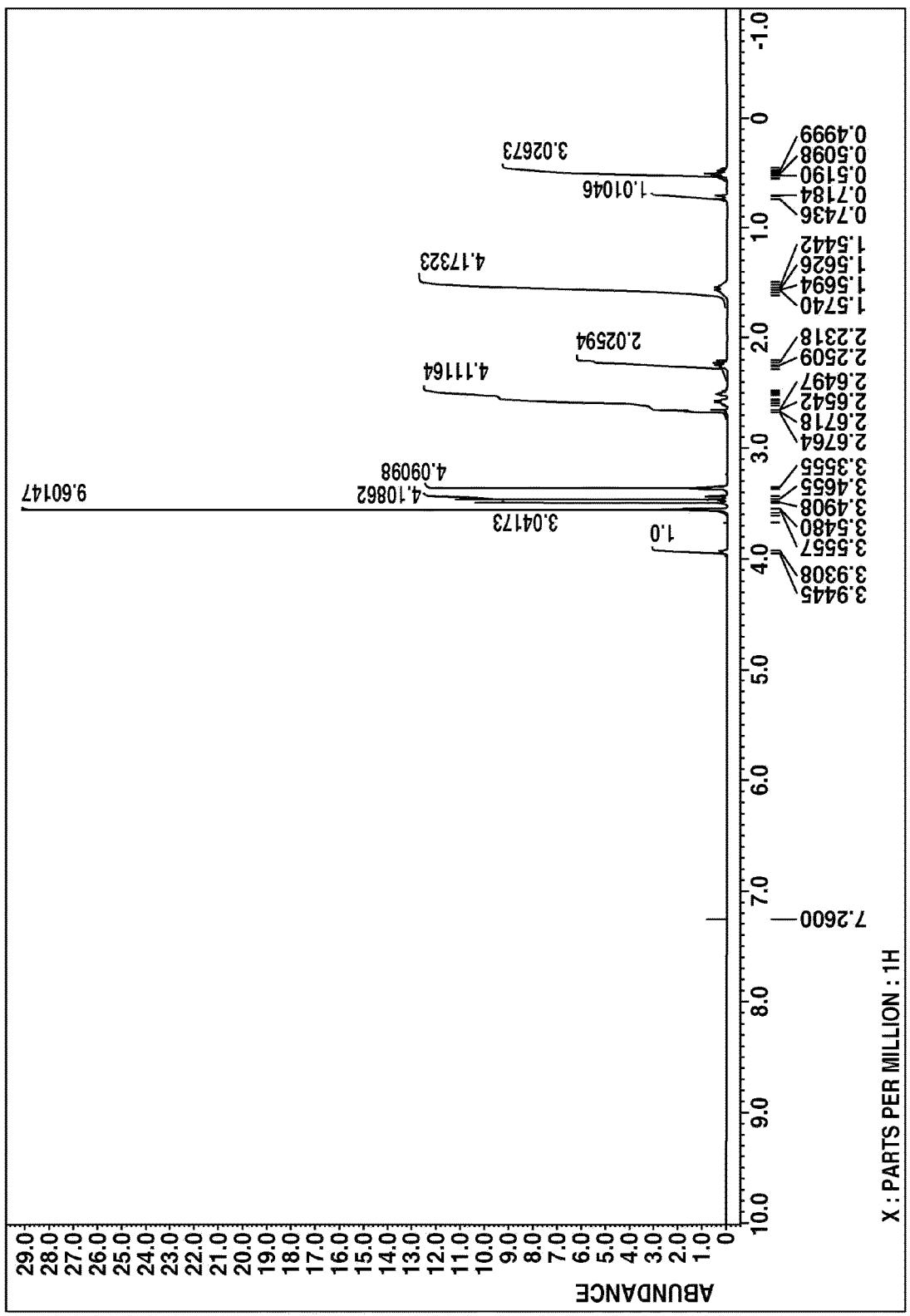
FIG. 1 is a $^1$H-NMR spectrum of a compound obtained in Example 1.

Hereinafter, the present invention is described in detail.
The cyclic aminoorganoxysilane compound according to the present invention has the following general formula (1).

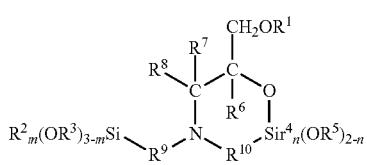

(1)

In the formula (1), $R^1$ represents a substituted or unsubstituted monovalent hydrocarbon group having 1 to 20 carbon atoms, $R^2$ to $R^5$ each independently represent a substituted or unsubstituted monovalent hydrocarbon group having 1 to 20 carbon atoms, $R^6$ to $R^8$ each independently represent a hydrogen atom or a substituted or unsubstituted monovalent hydrocarbon group having 1 to 20 carbon atoms, $R^9$ and $R^{1'}$ each independently represent a substituted or unsubstituted divalent hydrocarbon group having 1 to 20 carbon atoms optionally containing a heteroatom, m is 0, 1 or 2, and is preferably 0, and n is 0 or 1, and is preferably 0.

Here, examples of the monovalent hydrocarbon group having 1 to 20 carbon atoms, preferably having 1 to 10 carbon atoms, and more preferably having 1 to 5 carbon atoms of $R^1$ include a linear, branched or cyclic alkyl group, alkenyl group, aryl group, aralkyl group or the like.

Specifically, examples of the monovalent hydrocarbon group of the $R^1$ include: a linear alkyl group such as methyl, ethyl, n-propyl, n-butyl, n-pentyl, n-hexyl, n-heptyl, n-octyl, n-decyl, dodecyl, tetradecyl, hexadecyl, octadecyl, and icosyl groups; a branched alkyl group such as isopropyl, isobutyl, sec-butyl, tert-butyl, thexyl, and 2-ethylhexyl groups; a cyclic alkyl group such as cyclopentyl, and cyclohexyl groups; an alkenyl group such as vinyl, allyl, butenyl, and pentenyl groups; an aryl group such as phenyl, and tolyl groups; an aralkyl group such as a benzyl group and the like. Particularly, from the viewpoints of availability of raw materials and usefulness of products, an alkyl group having 1 to 3 carbon atoms such as a methyl group, an ethyl group, an n-propyl group and an isopropyl group; an alkenyl group having 2 to 5 carbon atoms such as an allyl group, a butenyl group, and a pentenyl group are preferable.

Examples of the monovalent hydrocarbon group having 1 to 20 carbon atoms, preferably having 1 to 10 carbon atoms, and more preferably having 1 to 5 carbon atoms of $R^2$ to $R^8$ include the same groups as those exemplified for the above-described $R^1$. Also in this case, particularly from the viewpoints of availability of raw materials and usefulness of products, preferable examples of $R^2$ to $R^5$ include an alkyl group having 1 to 3 carbon atoms such as a methyl group, an ethyl group, a propyl group, and an isopropyl group, and an alkenyl group having 2 to 5 carbon atoms such as an allyl group, a butenyl group and a pentenyl group, and preferable examples of $R^6$ to $R^8$ include a hydrogen atom.

Meanwhile, some or all of the hydrogen atoms in the above-described monovalent hydrocarbon groups of $R^1$ to $R^5$ may be substituted with other substituents, and specific examples of such substituents include an alkoxy group such as a methoxy group, an ethoxy group, and an (iso)propoxy group; a halogen atom such as a fluorine atom, a chlorine atom, a bromine atom, and an iodine atom; a cyano group; an amino group; an acyl group having 2 to 10 carbon atoms; a trichlorosilyl group; a trialkylsilyl group, a dialkylmonochlorosilyl group, a monoalkyldichlorosilyl group, a trialkoxysilyl group, a dialkylmonoalkoxysilyl group or a monoalkyldialkoxysilyl group in which each alkyl group or each alkoxy group has 1 to 5 carbon atoms. Two or more of these substituents may be used in combination, and the substitution position and the number of substituents are not particularly limited.

Examples of the heteroatom in the divalent hydrocarbon group having 1 to 20 carbon atoms, preferably having 1 to 10 carbon atoms, and more preferably having 1 to 5 carbon atoms of $R^9$ and $R^{11}$ which may contain a heteroatom include O, S, NH, and the like.

The above-described divalent hydrocarbon group may be any of linear, branched, and cyclic groups, and specific examples thereof include an alkylene group such as methylene, ethylene, methyl ethylene (propylene), trimethylene, methyl trimethylene, tetramethylene, hexamethylene, octamethylene, decamethylene, and isobutylene groups; an arylene group such as phenylene, and methyl phenylene groups; an aralkylene group such as ethylenephenylene, and ethylenephenylene methylene groups; an oxaalkylene group such as 2-oxapropylene, 2-oxapentylene groups and the like. Particularly, from the viewpoints of availability of raw materials, and usefulness of products, $R^9$ is preferably an alkylene group having 1 to 3 carbon atoms such as methylene, ethylene, and trimethylene groups, and $R^{10}$ is preferably an alkylene group having 1 to 3 carbon atoms such as methylene, ethylene, and trimethylene groups; and a 2-oxapropylene group.

Meanwhile, some or all of the hydrogen atoms in the above-described divalent hydrocarbon groups may be substituted with other substituents, and specific examples of such substituents include a halogen atom such as a fluorine atom, a chlorine atom, a bromine atom, and an iodine atom; a cyano group; an amino group; an acyl group having 2 to 10 carbon atoms; a trichlorosilyl group; a trialkylsilyl group, a dialkylmonochlorosilyl group, a monoalkyldichlorosilyl group, a trialkoxysilyl group, a dialkylmonoalkoxysilyl group or a monoalkyldialkoxysilyl group in which each alkyl group or each alkoxy group has 1 to 5 carbon atoms. Two or more of these substituents may be used in combination, and the substitution position and the number of substituents are not particularly limited.

Specific examples of the cyclic aminoorganoxysilane compound having the general formula (1) include:
2,2-dimethoxy-6-methoxymethyl-4-(trimethoxysilylmethyl)-1-oxa-4-aza-2-silacyclohexane,
2-methoxy-2-methyl-6-methoxymethyl-4-(dimethoxymethylsilylmethyl)-1-oxa-4-aza-2-silacyclohexane,
2,2-dimethyl-6-methoxymethyl-4-(methoxydimethylsilylmethyl)-1-oxa-4-aza-2-silacyclohexane,
2,2-diethoxy-6-methoxymethyl-4-(triethoxysilylmethyl)-1-oxa-4-aza-2-silacyclohexane,
2-ethoxy-2-methyl-6-methoxymethyl-4-(diethoxymethylsilylmethyl)-1-oxa-4-aza-2-silacyclohexane,
2,2-dimethyl-6-methoxymethyl-4-(ethoxydimethylsilylmethyl)-1-oxa-4-aza-2-silacyclohexane,
2,2-dimethoxy-8-methoxymethyl-6-(3-trimethoxysilylpropyl)-1-oxa-6-aza-2-silacyclooctane,
2-methoxy-2-methyl-8-methoxymethyl-6-(3-dimethoxymethylsilylpropyl)-1-oxa-6-aza-2-silacyclooctane,
2,2-dimethyl-8-methoxymethyl-6-(3-methoxydimethylsilylpropyl)-1-oxa-6-aza-2-silacyclooctane,
2,2-diethoxy-8-methoxymethyl-6-(3-triethoxysilylpropyl)-1-oxa-6-aza-2-silacyclooctane,
2-ethoxy-2-methyl-8-methoxymethyl-6-(3-diethoxymethylsilylpropyl)-1-oxa-6-aza-2-silacyclooctane,
2,2-dimethyl-8-methoxymethyl-6-(3-ethoxydimethylsilylpropyl)-1-oxa-6-aza-2-silacyclooctane,
2,2-dimethoxy-6-allyloxymethyl-4-(trimethoxysilylmethyl)-1-oxa-4-aza-2-silacyclohexane,
2-methoxy-2-methyl-6-allyloxymethyl-4-(dimethoxymethylsilylmethyl)-1-oxa-4-aza-2-silacyclohexane,
2,2-dimethyl-6-allyloxymethyl-4-(methoxydimethylsilylmethyl)-1-oxa-4-aza-2-silacyclohexane,
2,2-diethoxy-6-allyloxymethyl-4-(triethoxysilylmethyl)-1-oxa-4-aza-2-silacyclohexane,
2-ethoxy-2-methyl-6-allyloxymethyl-4-(diethoxymethylsilylmethyl)-1-oxa-4-aza-2-silacyclohexane,
2,2-dimethyl-6-allyloxymethyl-4-(ethoxydimethylsilylmethyl)-1-oxa-4-aza-2-silacyclohexane,
2,2-dimethoxy-8-allyloxymethyl-6-(3-trimethoxysilylpropyl)-1-oxa-6-aza-2-silacyclooctane,
2-methoxy-2-methyl-8-allyloxymethyl-6-(3-dimethoxymethylsilylpropyl)-1-oxa-6-aza-2-silacyclooctane,
2,2-dimethyl-8-allyloxymethyl-6-(3-methoxydimethylsilylpropyl)-1-oxa-6-aza-2-silacyclooctane,
2,2-diethoxy-8-allyloxymethyl-6-(3-triethoxysilylpropyl)-1-oxa-6-aza-2-silacyclooctane,
2-ethoxy-2-methyl-8-allyloxymethyl-6-(3-diethoxymethylsilylpropyl)-1-oxa-6-aza-2-silacyclooctane,
2,2-dimethyl-8-allyloxymethyl-6-(3-ethoxydimethylsilylpropyl)-1-oxa-6-aza-2-silacyclooctane,
2,2-dimethoxy-6-butoxymethyl-4-(trimethoxysilylmethyl)-1-oxa-4-aza-2-silacyclohexane,
2-methoxy-2-methyl-6-butoxymethyl-4-(dimethoxymethylsilylmethyl)-1-oxa-4-aza-2-silacyclohexane,
2,2-dimethyl-6-butoxymethyl-4-(methoxydimethylsilylmethyl)-1-oxa-4-aza-2-silacyclohexane,
2,2-diethoxy-6-butoxymethyl-4-(triethoxysilylmethyl)-1-oxa-4-aza-2-silacyclohexane,
2-ethoxy-2-methyl-6-butoxymethyl-4-(diethoxymethylsilylmethyl)-1-oxa-4-aza-2-silacyclohexane,
2,2-dimethyl-6-butoxymethyl-4-(ethoxydimethylsilylmethyl)-1-oxa-4-aza-2-silacyclohexane,
2,2-dimethoxy-8-butoxymethyl-6-(3-trimethoxysilylpropyl)-1-oxa-6-aza-2-silacyclooctane,
2-methoxy-2-methyl-8-butoxymethyl-6-(3-dimethoxymethylsilylpropyl)-1-oxa-6-aza-2-silacyclooctane,
2,2-dimethyl-8-butoxymethyl-6-(3-methoxydimethylsilylpropyl)-1-oxa-6-aza-2-silacyclooctane,
2,2-diethoxy-8-butoxymethyl-6-(3-triethoxysilylpropyl)-1-oxa-6-aza-2-silacyclooctane,
2-ethoxy-2-methyl-8-butoxymethyl-6-(3-diethoxymethylsilylpropyl)-1-oxa-6-aza-2-silacyclooctane,
2,2-dimethyl-8-butoxymethyl-6-(3-ethoxydimethylsilylpropyl)-1-oxa-6-aza-2-silacyclooctane,
2,2-dimethoxy-6-phenoxymethyl-4-(trimethoxysilylmethyl)-1-oxa-4-aza-2-silacyclohexane,
2-methoxy-2-methyl-6-phenoxymethyl-4-(dimethoxymethylsilylmethyl)-1-oxa-4-aza-2-silacyclohexane,
2,2-dimethyl-6-phenoxymethyl-4-(methoxydimethylsilylmethyl)-1-oxa-4-aza-2-silacyclohexane,
2,2-diethoxy-6-phenoxymethyl-4-(triethoxysilylmethyl)-1-oxa-4-aza-2-silacyclohexane,
2-ethoxy-2-methyl-6-phenoxymethyl-4-(diethoxymethylsilylmethyl)-1-oxa-4-aza-2-silacyclohexane,
2,2-dimethyl-6-phenoxymethyl-4-(ethoxydimethylsilylmethyl)-1-oxa-4-aza-2-silacyclohexane,
2,2-dimethoxy-8-phenoxymethyl-6-(3-trimethoxysilylpropyl)-1-oxa-6-aza-2-silacyclooctane,
2-methoxy-2-methyl-8-phenoxymethyl-6-(3-dimethoxymethylsilylpropyl)-1-oxa-6-aza-2-silacyclooctane,
2,2-dimethyl-8-phenoxymethyl-6-(3-methoxydimethylsilylpropyl)-1-oxa-6-aza-2-silacyclooctane,
2,2-diethoxy-8-phenoxymethyl-6-(3-triethoxysilylpropyl)-1-oxa-6-aza-2-silacyclooctane,
2-ethoxy-2-methyl-8-phenoxymethyl-6-(3-diethoxymethylsilylpropyl)-1-oxa-6-aza-2-silacyclooctane,
2,2-dimethyl-8-phenoxymethyl-6-(3-ethoxydimethylsilylpropyl)-1-oxa-6-aza-2-silacyclooctane and the like.

Examples of the process for producing the cyclic aminoorganoxysilane compound having the general formula (1) according to the present invention include a process comprising distilling a reaction mixture obtained by making an aminoorganoxysilane compound having the following general formula (2) (hereinafter, abbreviated as the compound (2)) react with an epoxy compound having the following general formula (3) (hereinafter, abbreviated as the compound (3)):

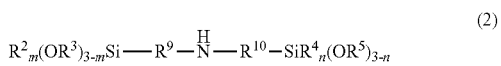

(2)

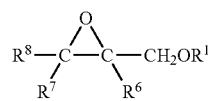

(3)

wherein $R^1$ to $R^{10}$, m and n represent the same meanings as described above.

More specifically, it is considered that as shown in the following scheme, in the first step, the compound (2) is made to react with the compound (3) to form an aminoorganoxysilane compound having a hydroxyl group, and in the second step, that is, in the step of distilling a reaction solution containing the aminoorganoxysilane compound having a hydroxyl group, intramolecular dealcoholization cyclization occurs to form a target cyclic aminoorganoxysilane compound.

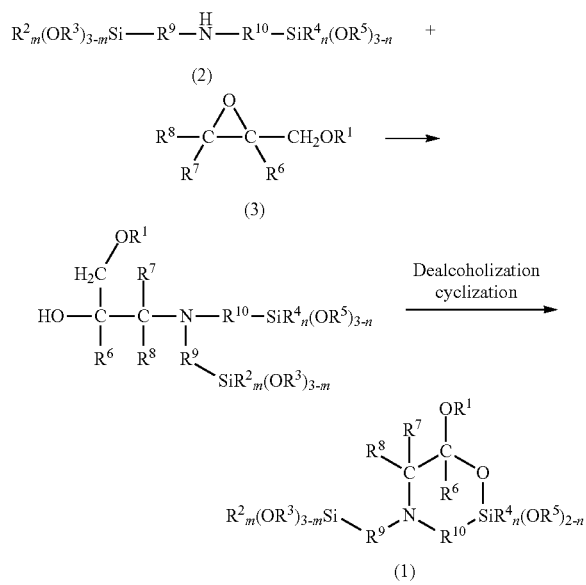

Specific examples of the compound (2) include bis(t-rimethoxysilylmethyl)amine, bis(dimethoxymethylsilylmethyl)amine, bis(methoxydimethylsilylmethyl)amine, bis(triethoxysilylmethyl)amine, bis(diethoxymethylsilylmethyl)amine, bis(ethoxydimethylsilylmethyl)amine, bis(3-trimethoxysilylpropyl)amine, bis(3-dimethoxymethylsilylpropyl)amine, bis(3-methoxydimethylsilylpropyl)amine, bis(3-triethoxysilylpropyl)amine, bis(3-diethoxymethylsilylpropyl)amine, bis(3-ethoxydimethylsilylpropyl)amine and the like.

Specific examples of the compound (3) include glycidyl methyl ether, allyl glycidyl ether, butyl glycidyl ether, glycidyl phenyl ether and the like.

The compounding ratio of the compound (2) and the compound (3) is not particularly limited, but from the viewpoint of reactivity and productivity, preferably 0.2 to 5.0 mol and more preferably 0.5 to 2.0 mol of the compound (3) is used per 1 mol of the compound (2).

Although the first step reaction proceeds even without a catalyst, a basic catalyst or an acidic catalyst may be used for the purpose of improving the reaction rate.

Specific examples of the basic catalyst include sodium hydroxide, potassium hydroxide, sodium methoxide, sodium ethoxide, a methanol solution of sodium methoxide, an ethanol solution of sodium ethoxide and the like.

On the other hand, specific examples of the acidic catalyst include an inorganic acid such as sulfuric acid, hydrochloric acid, and nitric acid; a sulfonic acid compound such as methanesulfonic acid, benzenesulfonic acid, toluenesulfonic acid, dodecylbenzenesulfonic acid, and trifluoromethanesulfonic acid as well as salts thereof and the like.

The amount of the catalyst to be used is not particularly limited, but from the viewpoint of reactivity and productivity, preferably 0.0001 to 0.2 mol and more preferably 0.001 to 0.1 mol of the catalyst is used per 1 mol of the compound (2).

Meanwhile, though the reaction in the first step proceeds even without a solvent, a solvent can also be used. Examples of the solvent used include a hydrocarbon-based solvent such as pentane, hexane, cyclohexane, heptane, isooctane, benzene, toluene, and xylene; an ether-based solvent such as diethyl ether, tetrahydrofuran, and dioxane; an ester-based solvent such as ethyl acetate, and butyl acetate; an aprotic polar solvent such as acetonitrile, N,N-dimethylformamide, and N-methylpyrrolidone; a chlorinated hydrocarbon-based solvent such as dichloromethane, and chloroform; an alcohol-based solvent such as methanol, ethanol, 1-propanol, and 2-propanol and the like. These solvents may be used singly or in combination of two or more kinds.

In the distillation process of the second step, although ordinary distillation processes can be used, in order to accelerate the reaction rate of the dealcoholation reaction, or in order to crack the intermolecular dealcoholation-condensed polymer compound present in the reaction solution and to convert it into a target cyclic aminoorganoxysilane compound, it is preferable to perform the distillation in the presence of a basic catalyst or an acidic catalyst.

As the basic catalyst and the acidic catalyst in this case, the same ones as described above can be used.

The amount of the catalyst to be used is not particularly limited, but from the viewpoint of reactivity and productivity, preferably 0.0001 to 0.2 mol and more preferably 0.001 to 0.1 mol of the catalyst is used per 1 mol of the compound (3).

Meanwhile, in the second step, the reaction solution obtained in the first step may be distilled as it is or the solvent may be further added to the reaction solution for distillation.

Further, examples of the solvent in this case include a hydrocarbon-based solvent such as pentane, hexane, cyclohexane, heptane, isooctane, decane, tridecane, octadecane, eicosane, benzene, toluene, xylene, and dodecylbenzene; an ether-based solvent such as diethyl ether, tetrahydrofuran, dioxane, and diphenyl ether; an ester-based solvent such as ethyl acetate, butyl acetate, methyl stearate, and methyl oleate; an aprotic polar solvent such as acetonitrile, N,N-dimethylformamide, and N-methylpyrrolidone; a chlorinated hydrocarbon-based solvent such as dichloromethane, and chloroform; an alcohol-based solvent such as methanol, ethanol, 1-propanol, 2-propanol, 1-decanol, 1-octadecanol, 2-hexyl-1-decanol, oleyl alcohol, and 1-docosanol and the like. These solvents may be used singly or in combination of two or more kinds.

EXAMPLES

Hereinafter, the present invention is described more specifically with reference to Examples, but the present invention is not limited to the following Examples.

Meanwhile, the $^1$H-NMR spectrum was measured with deuterated chloroform solvent at 600 MHz, and the IR spectrum was measured by D-ATR.

Example 1

102.5 g (0.3 mol) of bis(3-trimethoxysilylpropyl)amine and 19.2 g of methanol were charged in a flask equipped with a stirrer, a reflux condenser, a dropping funnel and a thermometer and the mixture was heated to 60° C. After the internal temperature was stabilized, 29.1 g (0.33 mol) of glycidyl methyl ether was added dropwise over 1 hour and the mixture was stirred at that temperature for 2 hours.

After completion of stirring, 0.6 g of a methanol solution of 28% by weight sodium methoxide was added to the reaction solution and the mixture was distilled to obtain 83.6 g of a fraction having a boiling point of 174 to 176° C./0.3 kPa.

Figure 2:
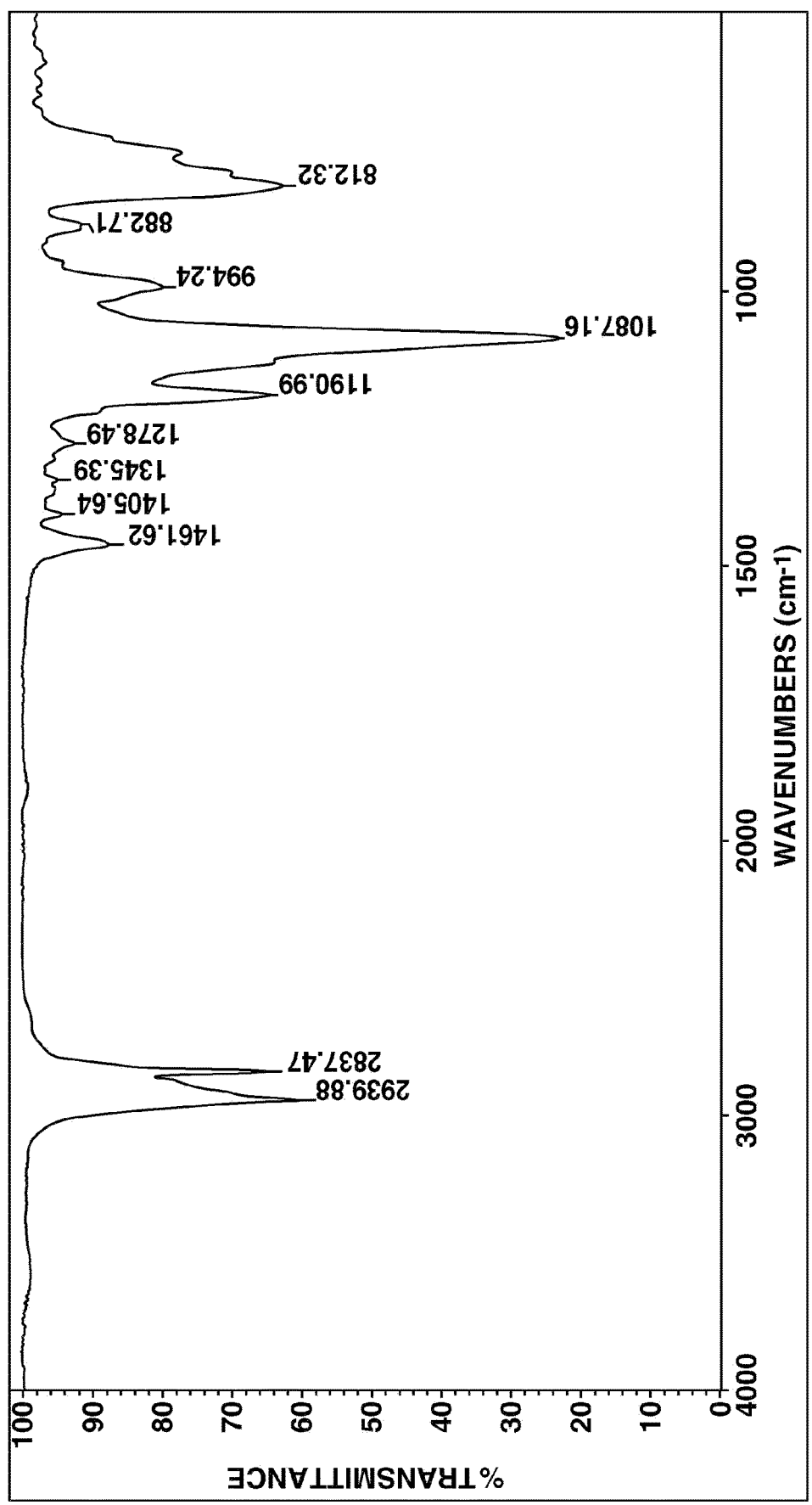
FIG. 2 is an IR spectrum of a compound obtained in Example 1.

Mass spectrum, $^1$H-NMR spectrum and IR spectrum of the obtained fraction were measured. The $^1$H-NMR spectrum is shown in FIG. 1, and the IR spectrum is shown in FIG. 2.

Mass Spectrum m/z 397, 366, 248, 160, 121, 91

From these results, it was confirmed that the obtained compound was 2,2-dimethoxy-8-methoxymethyl-6-(3-trimethoxysilylpropyl)-1-oxa-6-aza-2-silacyclooctane.

Example 2

136.6 g (0.4 mol) of bis(3-trimethoxysilylpropyl)amine and 25.6 g of methanol were charged in a flask equipped with a stirrer, a reflux condenser, a dropping funnel and a thermometer and the mixture was heated to 60° C. After the internal temperature was stabilized, 57.3 g (0.44 mol) of butyl glycidyl ether was added dropwise over 1 hour and the mixture was stirred at that temperature for 2 hours.

After completion of stirring, 0.8 g of a methanol solution of 28% by weight sodium methoxide was added to the reaction solution and the mixture was distilled to obtain 146.7 g of a fraction having a boiling point of 179 to 182° C./0.2 kPa.

Figure 3:
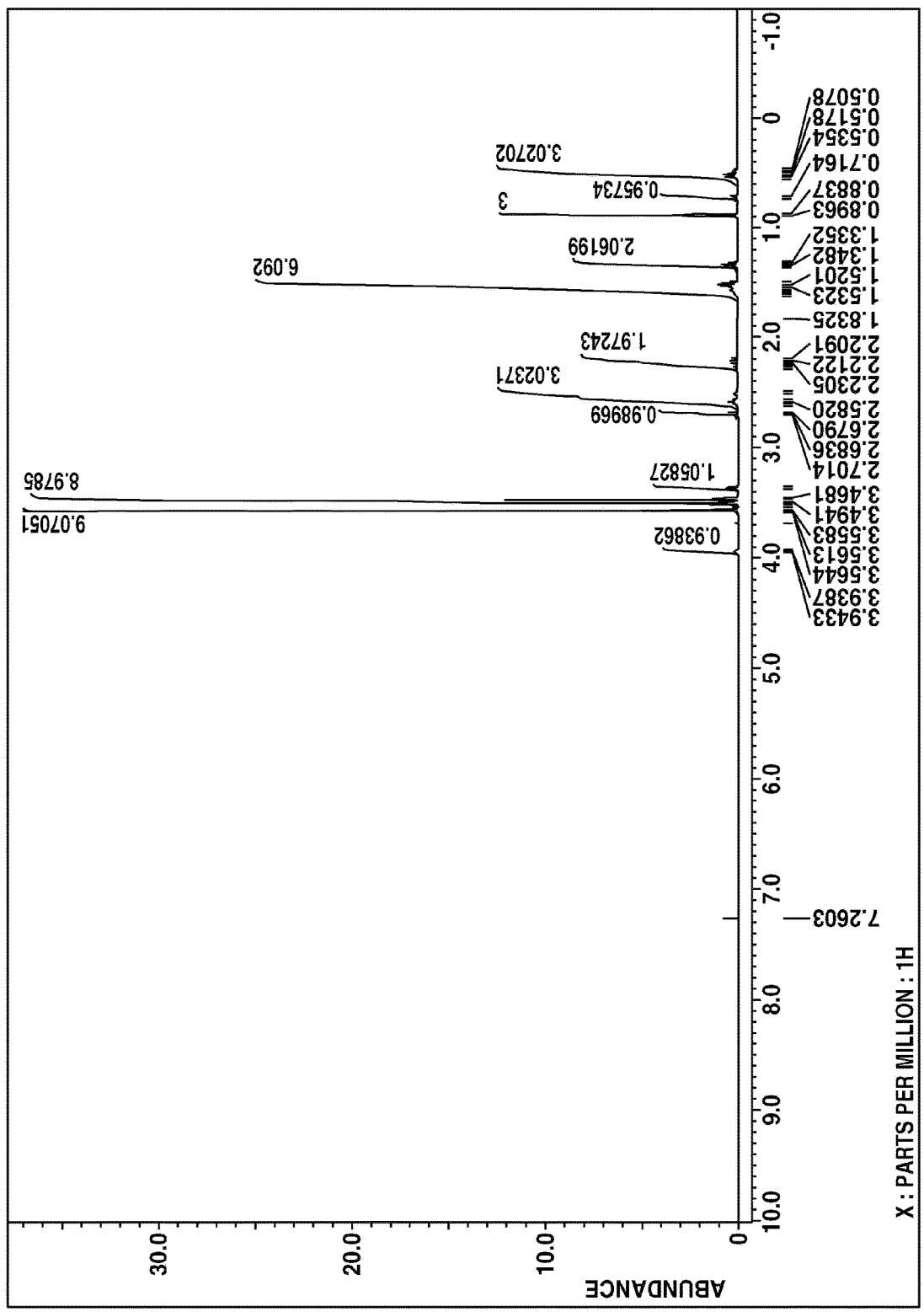
FIG. 3 is a $^1$H-NMR spectrum of a compound obtained in Example 2.
Figure 4:
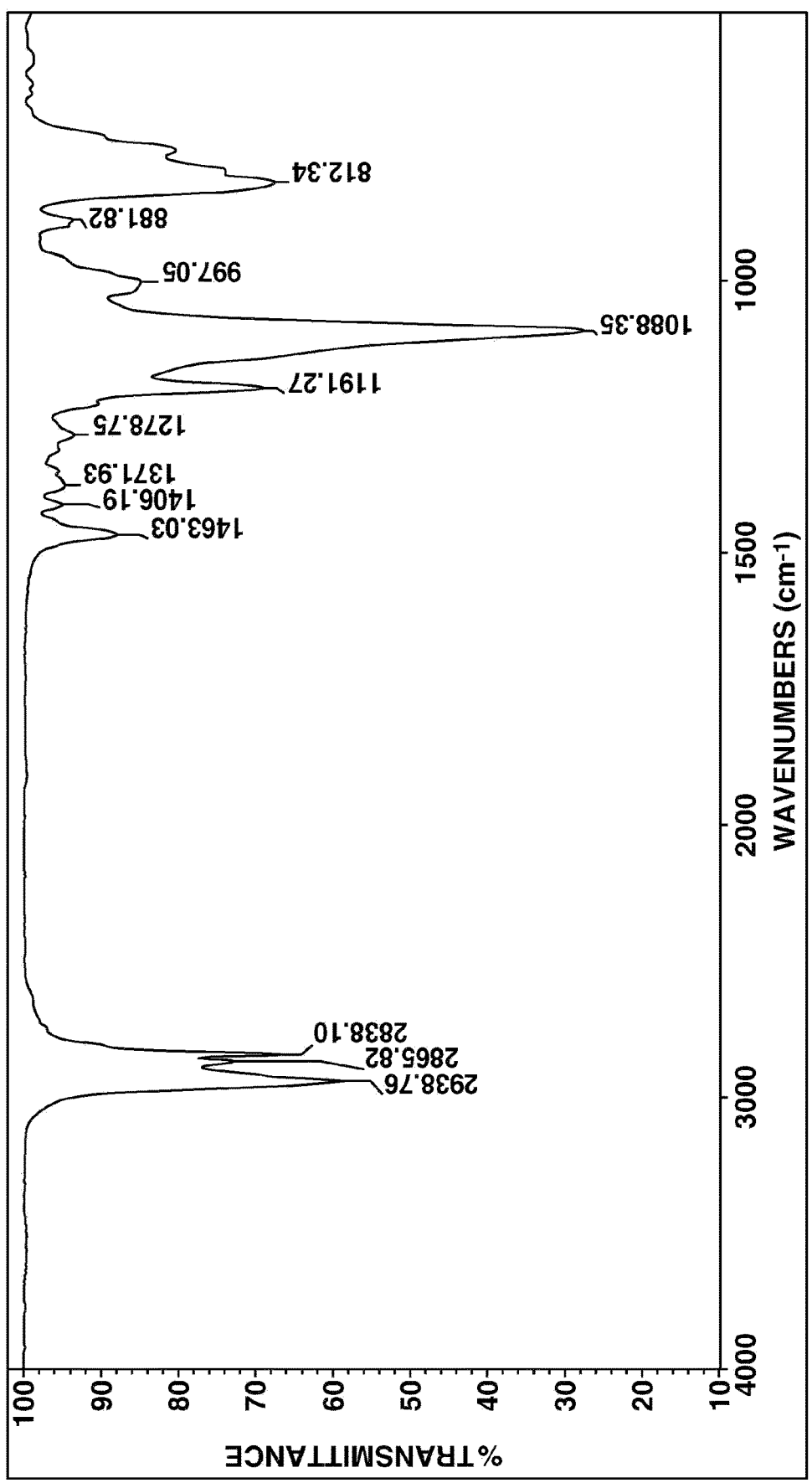
FIG. 4 is an IR spectrum of a compound obtained in Example 2.

Mass spectrum, $^1$H-NMR spectrum and IR spectrum of the obtained fraction were measured. The $^1$H-NMR spectrum is shown in FIG. 3, and the IR spectrum is shown in FIG. 4.

Mass Spectrum m/z 439, 408, 366, 290, 160, 121, 91

From these results, it was confirmed that the obtained compound was 2,2-dimethoxy-8-butoxymethyl-6-(3-trimethoxysilylpropyl)-1-oxa-6-aza-2-silacyclooctane.

Japanese Patent Application No. 2018-116813 is incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

The invention claimed is:

1. A cyclic aminoorganoxysilane compound having the following general formula (1):

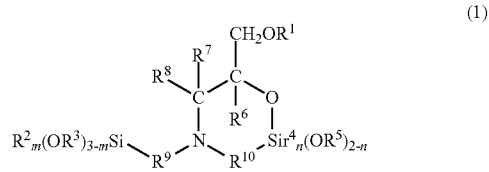

wherein $R^1$ represents a substituted or unsubstituted monovalent hydrocarbon group having 1 to 20 carbon atoms, $R^2$ to $R^5$ each independently represent a substituted or unsubstituted monovalent hydrocarbon group having 1 to 20 carbon atoms, $R^6$ to $R^8$ each independently represent a hydrogen atom or a substituted or unsubstituted monovalent hydrocarbon group having 1 to 20 carbon atoms, $R^9$ and $R^{10}$ each independently represent a substituted or unsubstituted divalent hydrocarbon group having 1 to 20 carbon atoms, m is 0, 1 or 2 and n is 0 or 1.

2. A process for producing the cyclic aminoorganoxysilane compound according to claim 1, the process comprising distilling a reaction mixture obtained by making an aminoorganoxysilane compound having the following general formula (2):

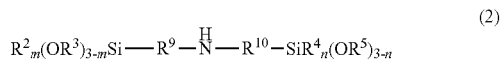

wherein $R^2$ to $R^5$, $R^9$, $R^{10}$, m and n represent the same meanings as those defined above react with an epoxy compound having the following general formula (3):

wherein $R^1$ and $R^6$ to $R^8$ represent the same meanings as those defined above.

3. The process for producing the cyclic aminoorganoxysilane compound according to claim 2, the process further comprising distilling the reaction mixture in the presence of a basic catalyst or an acidic catalyst.

* * * * *